Feb. 15, 1966  G. REVESZ ETAL  3,235,792
RANGE CHANGING CIRCUIT FOR NULL-BALANCE IMPEDANCE BRIDGES
Filed April 26, 1962  2 Sheets-Sheet 1

INVENTORS
George Revesz &
BY  Egils H. Evalds

ATTORNEY

United States Patent Office 3,235,792
Patented Feb. 15, 1966

3,235,792
RANGE CHANGING CIRCUIT FOR NULL-BALANCE IMPEDANCE BRIDGES
George Revesz, 420 Bryn Mawr Ave., Bala-Cynwyd, Pa., and Egils H. Evalds, 2106 Walnut St., Philadelphia, Pa.
Filed Apr. 26, 1962, Ser. No. 190,445
11 Claims. (Cl. 323—75)

This invention relates to means for adjusting the measuring span of null-balance impedance bridges and more particularly, to means for varying the range of the said measuring span in predetermined increments.

For purposes of illustration this invention will be described with respect to capacitance type impedance bridges with a span adjusting network incorporated therein, the invention residing in additions or improvements in the said span adjusting network.

While a single wide span adjustment over the full measuring range of an instrument provides an instrument adaptable to a large number of measurement parameters, this type of instrument suffers an accuracy deficiency. This results from the fact that only a single full-scale sweep, of an indicator associated with the said instrument, may be made for the entire span and therefore, errors in reading the indicator, particularly at both the low and high ends of the span, are more a result of difficult interpolation than a result of inherent instrument error.

It is an object of this invention to provide an impedance bridge wherein a wide selection of measuring spans is effected in a series of range changing steps, each of said steps comprising a desired measuring span and resulting maximum accuracy for a given measurement.

Another object of this invention is to provide an impedance bridge wherein a wide selection of measuring spans is effected in a series of range changing steps, said bridge including an indicator whereby a full-scale deflection over each of said selected spans is possible, whereby maximum accuracy is provided for said impedance bridge throughout the entire measuring range thereof.

These and other objects of this invention will become apparent with reference to the following specification and drawings which relate to several preferred embodiments of the invention.

Figure 1:
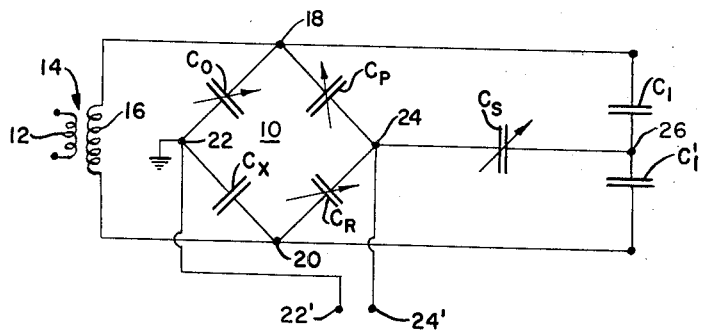
FIGURE 1 is a schematic showing of a capacitance bridge with a span adjusting circuit therein.

Referring in detail to the drawings and more particularly to FIGURE 1, the basic capacitance bridge circuit is generally shown at 10.

The bridge portion of the circuit is shown as comprising a probe or measuring capacitance $C_x$ in one arm, a zero setting capacitance $C_o$ in an adjacent arm, a preset capacitance $C_p$ in the arm opposite the probe capacitance $C_x$ and a rebalance capacitance $C_R$ in the arm opposite the zero setting capacitance $C_o$.

Radio frequency or other suitable alternating current energization is brought in from a power supply (not shown) through the primary winding 12 of a transformer 14 having the secondary winding 16 thereof connected across a pair of diagonally disposed bridge terminals 18 and 20. The terminal 18 comprises the junction between the capacitances $C_o$ and $C_p$ while the terminal 20 comprises the junction between the capacitances $C_x$ and $C_R$.

The other pair of diagonally disposed bridge terminals comprise a grounded output terminal 22 at the junction between the capacitances $C_o$ and $C_x$ and another output terminal 24 at the junction between the capacitances $C_p$ and $C_R$. A pair of leads extend these terminals 22 and 24 to a pair of bridge outputs 22′ and 24′, respectively.

The span adjusting network in the bridge circuit 10 comprises a pair of equal value capacitances $C_1$ and $C_1'$ connected in series across the power input terminals 18 and 20 of the bridge circuit 10 and having a terminal 26 therebetween, the network being completed by a variable span regulating capacitance $C_s$ connected between the ungrounded output terminal 24 of the bridge and the said terminal 26 between the equal value capacitances $C_1$ and $C_1'$. Thus a Y-connected adjusting network is provided.

The circuit of FIGURE 2 will next be described to set forth the additions made thereby to the circuit of FIGURE 1, after which a relative discussion of operation, theory and effect of the two circuits will be provided.

Figure 2:
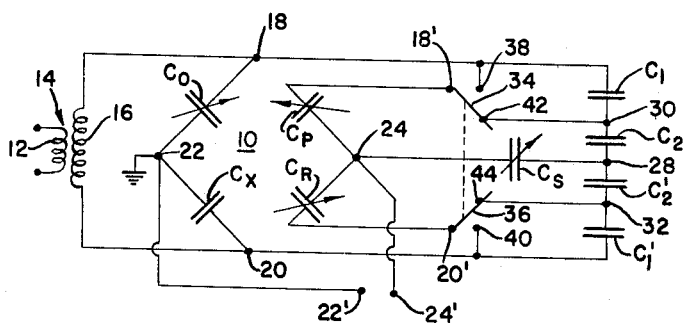
FIGURE 2 is a schematic diagram of one embodiment of the invention as applied to the circuit of FIGURE 1.

Referring now to FIGURE 2, the span adjusting network of the bridge circuit 10 is shown as comprising a plurality of capacitances $C_1$, $C_2$, $C_2'$ and $C_1'$ connected, in that order, in series from the power input terminal 18 of the power input terminal 20 of the bridge, with the variable span adjusting capacitance $C_s$ connected between the output terminal 24 and the junction 28 between the capacitances $C_2$ and $C_2'$. Additional intermediate junctions 30, between the capacitances $C_1$ and $C_2$, and 32, between the capacitances $C_2'$ and $C_1'$ are provided. Again, the span adjusting circuit is Y-connected.

The bridge input terminals 18 and 20 are shown as including switch terminals 18′ and 20′, respectively, about which a pair of ganged SPDT switches 34 and 36, respectively, are actuated. The switches 34 and 36 alternately connect the terminals 18 and 20 directly to the switch terminals 18′ and 20′ through the switch contacts 38 and 40, respectively, or connect the said terminals 18 and 20 to the switch terminals 18′ and 20′ through, respectively, contact 42, junction 30 and capacitance $C_1$ and contact 44, junction 32 and capacitance $C_1'$.

In understanding the following discussion of operation it should be noted that the output terminals 22′ and 24′ of both of the circuits of FIGURES 1 and 2 are the terminals across which a suitable indicating instrument (not shown) is connected. It is with respect to the readings on this suitably calibrated instrument that reference is made to full-scale readings.

The basic settings of the circuit of FIGURE 1 relate to zero adjustment and span adjustment, one being made independently of the other.

The zero adjustment is made by first adjusting the variable zero setting capacitance $C_o$ to equal the minimum capacitance of the sensing probe capacitance $C_x$. The preset or preset zero capacitance $C_p$ is then adjusted to equal the minimum capacitance of rebalance capacitance $C_R$. Now, under these conditions the bridge circuit of FIGURE 1 is balanced.

In this condition the bridge circuit 10 will have one fixed measuring span depending on the magnitude of the capacitance change in the rebalance capacitance $C_R$, from its minimum to its maximum value.

The Y-connected span adjusting network of FIGURE 1 comprising the interconnected capacitance $C_1$, $C_1'$ and $C_S$ provides a means for symmetrically adding initial or standing capacitance in parallel to the present capacitance $C_p$ and the rebalance capacitance $C_R$. Assuming $$C_1 = C_1' \gg C_S$$

and performing a Y-to-$\Delta$ transformation (not shown) on the circuit of FIGURE 1 the effect of the Y-connected span adjustment is determined as effectively placing a capacitance having a value $C_{1/2}$ across the power supply terminals 18 and 20 and capacitances of $\tfrac{1}{2}C_S$ in parallel with each of the preset and rebalance capacitances $C_p$ and $C_R$, respectively.

Since the supply voltage across the terminals 18 and 20 is symmetrical to both the probe-zero set and preset-rebalance halves of the bridge circuit, the following expression represents the zero or null-balance condition of the said bridge circuit.

$$\frac{C_R}{\tfrac{1}{2}C_S} = \frac{\Delta C}{Co}$$

where $\Delta C$ is the change in the probe capacitance $Cx$ caused by the condition being measured by the bridge circuit, $Cx$ actually being equal to the quantity $(Co + \Delta C)$.

Thus, an output at the terminals 22'–24' due to a change of $\Delta C$ against the standing probe capacitance $Co$ must be rebalanced by a change of like ratio in the rebalance capacitance $C_R$ with respect to its standing capacitance value of $\tfrac{1}{2}C_S$.

By changing the value of the span capacitance $C_S$, the ratio $C_R/\tfrac{1}{2}C_S$, hereinafter referred to as the rebalance ratio, may be selectively varied such that a given adjustable range of the rebalance capacitance $C_R$ may be used to rebalance the bridge for a wide range of values of $\Delta C$.

Referring now to FIGURE 2, the number of range changing steps is increased by this circuit which effectively provides a decreased span for each measurement made resulting in a much greater accuracy of the null-balance bridge system 10.

The supply voltage supplied to the present-rebalance half of the bridge is symmetrically attenuated by the relationship between the capacitances $C_1$ and $C_2$ and $C_1'$ and $C_2'$ whereby a smaller output voltage at the terminals 22' and 24' is effected for any given value of the rebalance ratio $C_R/\tfrac{1}{2}C_S$ than would be the output voltage for this same ratio in the circuit of FIGURE 1.

Thus, for a like change $\Delta C$ in the capacitance $$Cx = Co + \Delta C$$

at the probe, a greater change in $C_R$ is necessary in order to rebalance the bridge system 10 in response to the said change $\Delta C$ for the circuit of FIGURE 2 than in the circuit of FIGURE 1. A greater accuracy and decreased span for the particular measurement are the results.

The change in span effected by the circuit of FIGURE 2, is proportional to the voltage attenuation which may be expressed as voltage attenuation ratio:

$$\frac{C_1}{C_1 + C_2}$$

The balanced system expression for the circuit of FIGURE 2 is thus:

$$\frac{C_R}{\tfrac{1}{2}C_S}\left(\frac{C_1}{C_1 + C_2}\right) = \frac{\Delta C}{Co}$$

which may be rewritten as $$\frac{C_R}{\tfrac{1}{2}C_S} = \left(1 + \frac{C_2}{C_1}\right)\frac{\Delta C}{Co}$$

The ratio of $$\frac{C_1 + C_2}{C_1} \text{ or } \left(\frac{1 + C_2}{C_1}\right)$$

is the span attenuation ratio of the rebalance bridge system of FIGURE 2. Thus, by varying the relative values of $C_2$ and $C_1$ as well as the span capacitance $C_S$, a wide range of measuring spans may be provided.

Referring now to the following table, examples of the operation of the system of FIGURE 2 are shown:

Assuming:
(1) When range switches 34 and 36 are closed on contacts 38 and 40, respectively, let this be known as switch position A.
(2) When range switches 34 and 36 are closed on contacts 42 and 44, respectively, let this be known as switch position B.

| Sw. Pos. | Span Ratio $\left(1+\tfrac{C_2}{C_1}\right)$ | Rebalance Values | | | | Probe Values | | |
|---|---|---|---|---|---|---|---|---|
| | | $C_S$ | $\tfrac{1}{2}C_S$ | $C_R$ | $\frac{C_R}{\tfrac{1}{2}C_S}$ | $Co$ | $\frac{C}{Co}$ | $\Delta C$ |
| | | Pf. | Pf. | Pf. | Percent | Pf. | Percent | Pf. |
| A | 1:1 | 10 | 5 | 7.5 | 150 | 500 | 150 | 750 |
| A | 1:1 | 140 | 70 | 7.5 | 11 | 500 | 11 | 55 |
| B | 11:1 | 10 | 5 | 7.5 | 150 | 500 | $\frac{150}{11}=14$ | 70 |
| B | 11:1 | 140 | 70 | 7.5 | 11 | 500 | $\frac{11}{11}=1$ | 5 |

As can be seen from the table, switch position A produces accuracy in the system equivalent to that achieved in FIGURE 1, since $C_1$–$C_2$ and $C_1'$–$C_2'$ are lumped together in series in the span attenuation network. When the range changing switches 34 and 36 are in position B, the accuracy increases in direct proportion to the attenuation ratio.

Figure 3:
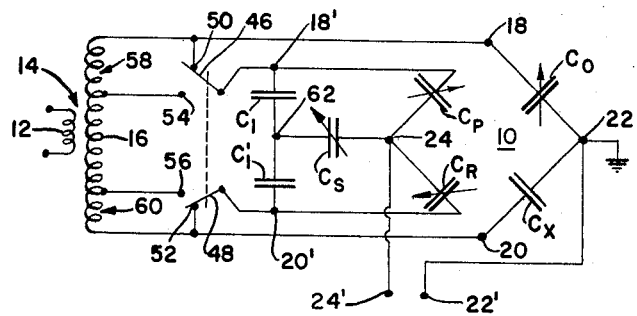
FIGURE 3 is a schematic diagram of another embodiment of the invention as applied to the circuit of FIGURE 1.

Referring to FIGURE 3, another embodiment of the invention will now be described.

In this embodiment, as in FIGURE 2, the bridge input terminals 18 and 20 are shown as including switch terminals 18' and 20', respectively, about which a pair of ganged SPDT switches 46 and 48, respectively are actuated. In one position the switches 46 and 48 connect the input terminals 18 and 20 directly to the switch terminals 18' and 20' via the terminals 50 and 52, respectively.

The other position of the ganged switches 46 and 48 is to a pair of terminals 54 and 56 comprising a pair of symmetrically located intermediate taps on the secondary 16 of the transformer 14. Thus, the input terminals 18 and 20, in this switch position are connected to the switch terminals 18' and 20' via a pair of equal segments 58 and 60, respectively, of the secondary 16 of the transformer 14 and the said terminals or taps 54 and 56.

A Y-connected span attenuation network comprising capacitances $C_1$ and $C_1'$ connected in series across the terminals 18' and 20' and an adjustable span capacitance $C_S$ connected between the junction 62 between the capacitances $C_1$ and $C_1'$ and the bridge output terminal 24 is provided to complete the rebalance system.

Here, as in FIGURE 2, an attenuation in voltage delivered to the rebalance half of the bridge circuit is used as a range changing means. Since a tapped inductance in the form of the secondary 16 is used, the voltage attenuation ratio may be expressed as $N_S/N_L$ where $N_S$ is the number of turns in the secondary 16 between the taps 54 and 56 and $N_L$ is the total number of turns in the secondary 16.

The balance equation for the system of FIGURE 3 thus becomes:

$$\frac{C_R}{\tfrac{1}{2}C_S}\left(\frac{N_S}{N_L}\right) = \frac{\Delta C}{Co}$$

or $$\frac{C_R}{\tfrac{1}{2}C_S} = \left(\frac{N_L}{N_S}\right)\frac{\Delta C}{Co}$$

The span attenuation ratio in this embodiment is $N_L/N_S$.

Figure 4:
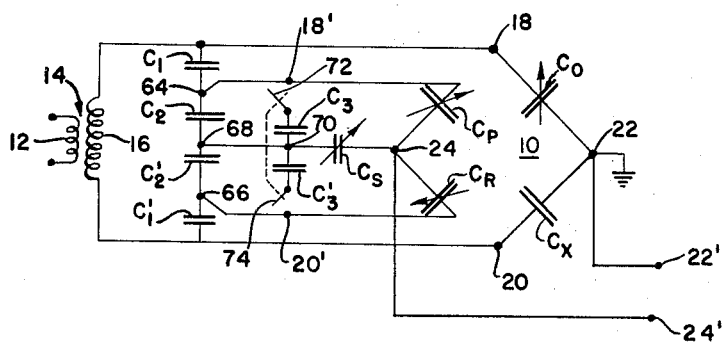
FIGURE 4 is a schematic diagram of yet another embodiment of the invention as applied to the circuit of FIGURE 1.

Referring now to FIGURE 4, still another embodiment of the invention is shown.

The circuit shown is similar to that of FIGURE 2 in that a pair of capacitances $C_1$–$C_1'$ and a second pair of capacitances $C_2$–$C_2'$ are symmetrically arranged in series across the secondary 16 of the transformer 14 with terminals 64 and 66 between capacitances $C_1$–$C_2$ and $C_2'$–$C_1'$, respectively, connected with the switch terminals 18' and 20' of the rebalance half of the bridge circuit. These capacitances are combined with an adjustable span capacitance $C_S$ which is connected from the junction 68, between capacitances $C_2$ and $C_2'$, and the bridge output terminal 24.

A pair of equal capacitances $C_3$ and $C_3'$ are connected at a junction 70, common with the junction 68 between the capacitances $C_2$ and $C_2'$ and are made selectively and simultaneously connectable, respectively, with the switch terminals 18' and 20' by a pair of ganged SPST switches 72 and 74. Thus, the capacitances $C_3$ and $C_3'$ are switched in circuit in parallel with the capacitances $C_2$ and $C_2'$, respectively, or are switched out of the circuit entirely, as desired.

The voltage attenuation with $C_3$ and $C_3'$ out of the circuit provides the following balance equation as derived for FIGURE 2:

$$\frac{C_R}{\tfrac{1}{2}C_S} = \left(1 + \frac{C_2}{C_1}\right)\frac{\Delta C}{C_0}$$

With the insertion of C and C' in the circuit, however, a further attenuation of the input voltage to the rebalance half of the bridge is effected and the increased accuracy of the bridge circuit is exemplified by the following new balance equation:

$$\frac{C_R}{\tfrac{1}{2}C_S} = \left(1 + \frac{C_2 + C_3}{C_1}\right)\frac{\Delta C}{C_0}$$

Thus, with the capacitors C and C' connected in circuit, the span attenuation ratio is $$\left(1 + \frac{C_2 + C_3}{C_1}\right)$$

showing that a plurality of capacitors such as $C_3$ and $C_3'$ connected in parallel with $C_2$ and $C_2'$ may be added to further increase the accuracy of the system. Thus, the expression $$\left(1 + \frac{C_2 + C_3 + \ldots C_N}{C_1}\right)$$

is a more general expression for the span attenuation ratio, where N is integer greater than three (3).

As can be seen from the foregoing specification and drawings, this invention provides a means for selectively varying the accuracy of a rebalance bridge system by attenuating the voltage input to the rebalance half of the bridge circuit, whereby the measuring span of the system is selectively varied over a wide range.

It is to be understood that the embodiments shown and described herein are for the purpose of example only and are not intended to limit the scope of the appended claims.

What is claimed is:

1. In a null balance impedance bridge having a pair of rebalance arms, a pair of detecting arms, a pair of output terminals each comprising the intermediate junction of each of said pair of arms and a pair of input terminals comprising the outer end terminals of said detecting arms, means for selectively varying the measuring span of said bridge for any given measurement within the total useful range of said bridge comprising first and second switch terminals connected in circuit with said input terminals comprising the outer end terminals of the said rebalance arms, first and second equal impedance means connected in series between said first and second switch terminals and having a common junction therebetween, a third variable impedance means between said common junction and said intermediate junction of said pair of rebalance arms, a fourth impedance means symmetrical with respect to both of said rebalance arms having third and fourth switch terminals one on each side thereof, circuit means, and switch means for selectively connecting said first and second switch terminals with said third and fourth switch terminals, respectively.

2. The invention defined in claim 1, wherein said first and second equal impedance means comprise equal capacitances and said third impedance means comprises a variable capacitance.

3. The invention defined in claim 1, wherein said fourth impedance means comprises a pair of equal capacitances connected one between either end of said first and second series connected equal impedances and a respective one of said pair of bridge input terminals, whereby said fourth impedance means is symmetrical with respect to both of said rebalance arms.

4. The invention defined in claim 1, wherein said first and second equal impedance means comprise equal capacitances and said third impedance means comprises a variable capacitance and wherein said fourth impedance means comprises a pair of equal capacitances connected one between either end of said first and second series connected equal impedances and a respective one of said pair of bridge input terminals, whereby said fourth impedance means is symmetrical with respect to both of said rebalance arms.

5. The invention defined in claim 1, wherein said fourth impedance means comprises an inductor connected between said bridge input terminals having a center portion and two equal end portions defined by a pair of intermediate taps thereon, said taps and said switch means cooperating to selectively and alternatively connect said center portion and said entire inductor, respectively, between said switch terminals.

6. The invention defined in claim 1, wherein said first and second equal impedance means comprise equal capacitances and said third impedance means comprises a variable capacitance and wherein said fourth impedance means comprises an inductor connected between said bridge input terminals having a center portion and two equal end portions defined by a pair of intermediate taps thereon, said taps and said switch means cooperating to selectively and alternatively connect said center portion and said entire inductor, respectively, between said switch terminals.

7. The invention defined in claim 1, wherein said fourth impedance means comprises fifth and sixth equal impedance means connected one between either end of said first and second series connected equal impedances and a respective one of said pair of bridge input terminals, and seventh and eighth equal impedance means connected in series between a pair of switch taps and having a common junction therebetween common with the said common junction between said first and second equal impedance means, said switch means cooperating with said pair of switch taps to selectively connect said seventh and eighth equal impedances across said switch terminals.

8. The invention defined in claim 7, wherein said fifth, sixth, seventh and eighth impedances are capacitances.

9. The invention defined in claim 1, wherein said first and second equal impedance means comprise equal capacitances and said third impedance means comprises a variable capacitance and wherein said fourth impedance means comprises fifth and sixth equal impedance means connected one between either end of said first and second series connected equal impedances and a respective one of said pair of bridge input terminals, and seventh and eighth equal impedance means connected in series between a pair of switch taps and having a common junction therebetween common with the said common junction between said first and second equal impedance means, said switch means cooperating with said pair of switch taps to selectively connect said seventh and eighth equal impedances across said switch terminals.

10. The invention defined in claim 9, wherein said fifth, sixth, seventh and eighth impedances are capacitances.

11. In a null balance impedance bridge having a pair of rebalance arms each including variable impedance means, a pair of detecting arms each including variable impedance means, a pair of output terminals each comprising the intermediate junction of each of said pair of arms, a pair of input terminals comprising the outer end terminals of said detecting arms, and a source of alternating supply voltage connected across said input terminals, means for selectively varying the measuring span of said bridge for any given measurement within the total useful range of said bridge comprising a plurality of impedance means and means selectively and symmetrically interconnecting selected ones of said impedance means in circuit between said source and said rebalance arms effecting symmetrical attenuation of the voltage supplied by said source to said respective rebalance arms, whereby the impedance change in one of said rebalancing arms necessary to rebalance said bridge in response to given impedance change in one of said detecting arms may be selectively varied to permit maximum accuracy of said bridge circuit throughout its entire measuring range.

References Cited by the Examiner

UNITED STATES PATENTS

| | | | |
|---|---|---|---|
| 2,046,704 | 7/1936 | Slonczewski | 324—59 |
| 2,457,165 | 12/1948 | McNamee | 323—75 |
| 2,489,328 | 11/1949 | Salinger | 323—75 X |
| 2,525,425 | 10/1950 | Reynst | 323—123 |
| 2,934,699 | 4/1960 | Offner | 324—57 |
| 2,996,915 | 8/1961 | Greenwood et al. | 323—75 X |
| 3,077,561 | 2/1963 | Revesz | 324—57 |

MAX L. LEVY, *Primary Examiner.*